United States Patent
Sinha et al.

(10) Patent No.: US 12,518,746 B2
(45) Date of Patent: Jan. 6, 2026

(54) SYSTEM AND METHOD FOR DETERMINING AN INTENT OF A USER FROM AN UTTERANCE OF THE USER

(71) Applicant: Ubona Technologies Private Limited, Bengaluru (IN)

(72) Inventors: Nimesh Sinha, Bangalore (IN); Abhi Dattasharma, West Bengal (IN); Amit Ghosh, West Bengal (IN)

(73) Assignee: UBONA TECHNOLOGIES PRIVATE LIMITED, Bengaluru (IN)

(*) Notice: Subject to any disclaimer, the term of this patent is extended or adjusted under 35 U.S.C. 154(b) by 288 days.

(21) Appl. No.: 18/299,462

(22) Filed: Apr. 12, 2023

(65) Prior Publication Data
US 2024/0347052 A1    Oct. 17, 2024

(51) Int. Cl.
*G10L 15/22*    (2006.01)
*G10L 15/18*    (2013.01)
*G10L 15/197*   (2013.01)
*G10L 15/30*    (2013.01)

(52) U.S. Cl.
CPC ........ *G10L 15/1815* (2013.01); *G10L 15/197* (2013.01); *G10L 15/22* (2013.01); *G10L 15/30* (2013.01)

(58) Field of Classification Search
CPC . G10L 15/1822; G10L 15/1815; G10L 15/22; G10L 15/18; G10L 15/30; G10L 15/16; G10L 15/063; G10L 15/197
USPC ........................................................ 704/240
See application file for complete search history.

(56) References Cited

U.S. PATENT DOCUMENTS

| | | | | |
|---|---|---|---|---|
| 8,688,453 | B1* | 4/2014 | Joshi | G10L 15/00 707/738 |
| 9,009,046 | B1* | 4/2015 | Stewart | G10L 15/22 704/270.1 |
| 11,386,266 | B2* | 7/2022 | Davidson | G06F 16/3347 |
| 11,626,108 | B2* | 4/2023 | Nair | G10L 15/16 704/232 |
| 11,942,080 | B2* | 3/2024 | Mirrezaei | G10L 15/1815 |
| 2006/0212294 | A1* | 9/2006 | Gorin | G10L 15/18 704/E15.018 |
| 2013/0266925 | A1* | 10/2013 | Nunamaker, Jr. | G09B 7/00 434/362 |

(Continued)

*Primary Examiner* — Vijay B Chawan
(74) *Attorney, Agent, or Firm* — CANTOR COLBURN LLP (57) ABSTRACT

Disclosed is a system and method for determining an intent of a user from an utterance of the user. The system initially builds an intent determination model using a plurality of sample utterances, each assigned with at least one intent class. That is, on receiving the sample utterances, the system extracts significant word pairs from each sample utterance, computes a distinction factor of each significant word pairs, computes a Positive Probability and a Negative Probability for each significant word pairs, and generates the intent determination model by storing each significant word pairs and its distinction factor, the Positive Probability and the Negative Probability. Then on receiving any new utterance, the system extracts significant word pairs, identifies one or more matching word pairs in the model and determines the intent of based on the distinction factor, Positive Probability, and the Negative Probability of the one or more matched word pairs.

8 Claims, 4 Drawing Sheets

(56) References Cited

U.S. PATENT DOCUMENTS

| | | | | |
|---|---|---|---|---|
| 2014/0244249 A1* | 8/2014 | Mohamed | ............... | G10L 25/63 |
| | | | | 704/233 |
| 2015/0142447 A1* | 5/2015 | Kennewick | ............. | G10L 15/24 |
| | | | | 704/275 |
| 2016/0148610 A1* | 5/2016 | Kennewick, Jr. | ....... | G10L 15/18 |
| | | | | 704/240 |
| 2016/0196820 A1* | 7/2016 | Williams | ............ | G10L 15/1822 |
| | | | | 704/244 |
| 2020/0117709 A1* | 4/2020 | Galitsky | ................ | G06N 20/00 |
| 2020/0257857 A1* | 8/2020 | Peper | ....................... | G06F 40/35 |
| 2020/0395001 A1* | 12/2020 | Mohanty | ............. | G06F 16/3344 |
| 2021/0287667 A1* | 9/2021 | Tan | ........................ | G10L 15/063 |
| 2022/0050968 A1* | 2/2022 | Xie | ......................... | H04L 51/02 |
| 2022/0101838 A1* | 3/2022 | George | ............... | G06F 16/3329 |
| 2022/0129556 A1* | 4/2022 | Chen | ........................ | G06F 21/74 |
| 2023/0128422 A1* | 4/2023 | Li | ........................... | G10L 15/24 |
| | | | | 345/156 |
| 2023/0335120 A1* | 10/2023 | Kim | ................... | G10L 15/1822 |
| 2024/0020478 A1* | 1/2024 | Will, IV | ................. | G06F 40/30 |
| 2024/0347052 A1* | 10/2024 | Sinha | ................. | G10L 15/1822 |

* cited by examiner

SYSTEM AND METHOD FOR DETERMINING AN INTENT OF A USER FROM AN UTTERANCE OF THE USER

TECHNICAL FIELD

The present disclosure generally relates to virtual assistants and interactive voice response (IVR) systems, and more particularly to a system and method for determining the intent of a user from their utterances.

BACKGROUND

Enterprises, including online service providers, aggregators, banks, etc., often provide one or more communication channels to enable their customers to initiate communication with the enterprise for any enquiries such as but not limited to service, billing, product, and technical support related queries. For example, a customer may contact a customer support center of an enterprise by phone, email, online chat services, etc. However, such conventional methods have multiple disadvantages. For example, email communications prevent the customers from receiving real-time communications from the enterprise. Contacting by phone or online chat session may require a long waiting time. In addition, the enterprises may need to allocate sufficient human resources to handle large a customer base. Moreover, allocating human resources to handle minor queries of the customers adds to the operational cost of an enterprise.

To address the above-mentioned drawbacks and to increase the efficiency of interactions, virtual assistants or Interactive Voice Response (IVR systems are used, with minimal or no human interventions, in chat sessions and voice calls to provide real time responses to the customer queries. For example, an insurance company may use an IVR system to gather customer data and to provide the customer with the information, such as premium to be paid, date of premium, policy details, etc. During the conversation with the customer, the IVR system identifies the query (intent) of the customer by analyzing the spoken words (utterances) of the customer and collects sufficient information from the customer and addresses the query by fetching and providing relevant information to the customer.

Typically, the conventional IVR systems try to detect the overall context of the speech or use natural language intent predictor (BERT (Bidirectional Encoder Representations from Transformers) model, for example) and rule-based methods for predicting an intent of a user from the utterances of the user. Such systems extract words from the user utterances and identify the intent using predefined rules. However, the conventional systems often fail to determine the right intent of users. For example, the utterances of a user during a conversation may be casual and hence can be drastically different from the language normally used by the user in formal writing or speech. Moreover, in countries with multiple languages, the user may use words from different languages during a conversation and often even in the same sentence. Conventional systems fail to determine the intent from such utterances.

BRIEF SUMMARY

This summary is provided to introduce a selection of concepts in a simple manner that is further described in the detailed description of the disclosure. This summary is not intended to identify key or essential inventive concepts of the subject matter nor is it intended for determining the scope of the disclosure.

To overcome at least one of the problems mentioned above, there exists a need for a system and method for determining an intent of a user under the circumstances described.

Embodiment of the present disclosure discloses a system and method for building an intent determination model for determining an intent of a user utterance. The method comprises, a step of receiving by a receiving module and storing in a memory, a plurality of sample utterances with each utterance having at least one human assigned intent class, a step of extracting one or more significant word pairs, by significant word pair extraction module, from each sample utterance and storing the significant word pairs in a memory, a step of computing a distinction factor of each significant word pairs, by a distinction factor computing module, and storing each significant word pair and its computed distinction factors as a pair in a memory, a step of computing, for each significant word pair, a Positive Probability, by a probability determination module, and storing each significant word pair and its Positive Probability in a memory, and a step of computing, for each significant word pair, a Negative Probability, by the probability determination module, and storing each significant word pair and its Negative Probability in database.

Embodiments of the present disclosure further discloses a method for determining an intent of a user using the intent determination model, wherein the method comprises, receiving, by the receiving module, an utterance of the user, extracting, by the significant word pair extractor, one or more significant word pairs from the utterance of the user, identifying, by an intent determination module, one or more significant word pairs stored in the model matching each of the one or more significant word pairs extracted from the utterance of the user, determining, by the intent determination module, the intent of the utterance based on significant word pair distinction factor, the Positive Probability and the Negative Probability for each of the significant word pairs, for determining the intent of the user utterances.

To further clarify advantages and features of the present disclosure, a more particular description of the disclosure will be rendered by reference to specific embodiments thereof, which is illustrated in the appended figures. It is to be appreciated that these figures depict only typical embodiments of the disclosure and are therefore not to be considered limiting of its scope. The disclosure will be described and explained with additional specificity and detail with the accompanying figures.

BRIEF DESCRIPTION OF THE FIGURES

The disclosed method and system will be described and explained with additional specificity and detail with the accompanying figures in which.

Further, persons skilled in the art to which this disclosure belongs will appreciate that elements in the figures are illustrated for simplicity and may not have been necessarily drawn to scale. Furthermore, in terms of the construction of the joining ring and one or more components of the bearing assembly may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

In the present disclosure, relational terms such as first and second, and the like, may be used to distinguish one entity from the other, without necessarily implying any actual relationship or order between such entities.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more elements or structures or components preceded by "comprises . . . a" does not, without more constraints, preclude the existence of other elements, other structures, other components, additional devices, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The components, methods, and examples provided herein are illustrative only and not intended to be limiting.

Embodiments of the present disclosure will be described below in detail with reference to the accompanying figures.

Embodiments of the present disclosure disclose a system and method for determining an intent of a user from their utterances. The system and method can be used with interactive voice response (IVR) systems for determining an intent of a user during an online interaction or conversation, and hence for providing useful information to the user in real-time or near real-time. However, the disclosed system and method may be used for determining an intent of a user from their utterances for any other applications or purposes. In one embodiment of the present disclosure, the system initially builds an intent determination model for determining an intent of a user from the user's utterances.

To build the intent determination model, the system initially receives a plurality of utterances (sample utterances) with each utterance having an intent class assigned by a human agent. The pair-utterance and associated intent class—are stored in a memory. These can be thought of as intent classes and a group of utterances belonging to that intent class. The system then extracts one or more significant pairs of words (significant word pairs, hereinafter) from each utterance. Significant word pairs means that non distinct words such as pronouns, definite and indefinite articles, prepositions, conjunctions, and any other predefined stop words are deleted from the utterances and all the remaining words are paired to form unique pairs. Hence, they are referred to as significant word pairs.

The system then computes the distinction factor of each significant word pair. One exemplary way of determining a distinction factor of each significant word pair may be to find the number of intent classes to which a word pair belongs and to find the total number of intent classes. The ratio of the two may be treated as the distinction factor of the word pair. That means that if a word pair belongs to two intent classes in a given set of intent classes, its distinction factor is more significant than a significant word pair that belongs to, say, five intent classes. That means, the significance is inversely proportional to the numerical value of the calculated ratio. Other ways of determining the distinction factors may also be thought of by a person skilled in the art to which this disclosure belongs and all such variants are deemed to be within the scope of this disclosure.

For each significant word pair, the system computes a Positive Probability and a Negative Probability. It is to be noted that probability is always a number between 0 and +1. However, the terms Positive Probability and Negative Probability are used herein as proper nouns and hence are denoted by capitalizing both words of each term. They are defined herein as the probability of calculating the intent class to which the significant word pair actually belongs and the probability of predicting an intent class to which the significant word pair does not belong. As is evident that the positive probability is greater if the distinction factor is higher.

Thus, the intent determination model comprises the plurality of utterances and their human assigned intent classes, extracted significant word pairs and the distinction factors of each of the significant word pairs, the probability of predicting the intent class to which a significant word pair actually belongs (Positive Probability), and a probability of predicting an intent class, to which the significant word pair does not belong (Negative Probability).

Then, the system uses the intent determination model for determining an intent of a user through an utterance of the user. That is, on receiving an utterance of a user (an utterance from which the intent is to be determined), the system extracts one or more significant word pairs from the utterance of the user and identifies a matching significant word pair in the intent determination model for each of the extracted significant word pairs. If a matching significant word pair is available, the system determines the intent class of the utterance based on the distinction factors (DF or word pair distinction factor (WDF)) of significant word pair, the Positive Probability and the Negative Probability of the significant word pair, to which the significant word pair does not belong for each of the significant word pair. If a matching pair is not available in the intent determination model, the system submits the utterance to a human user for assigning one or more intent classes to it. It receives an intent class for the utterance which may be an existing intent class or a new intent class and updates the intent determination model with the received intent class identified by the human user.

Figure 1:
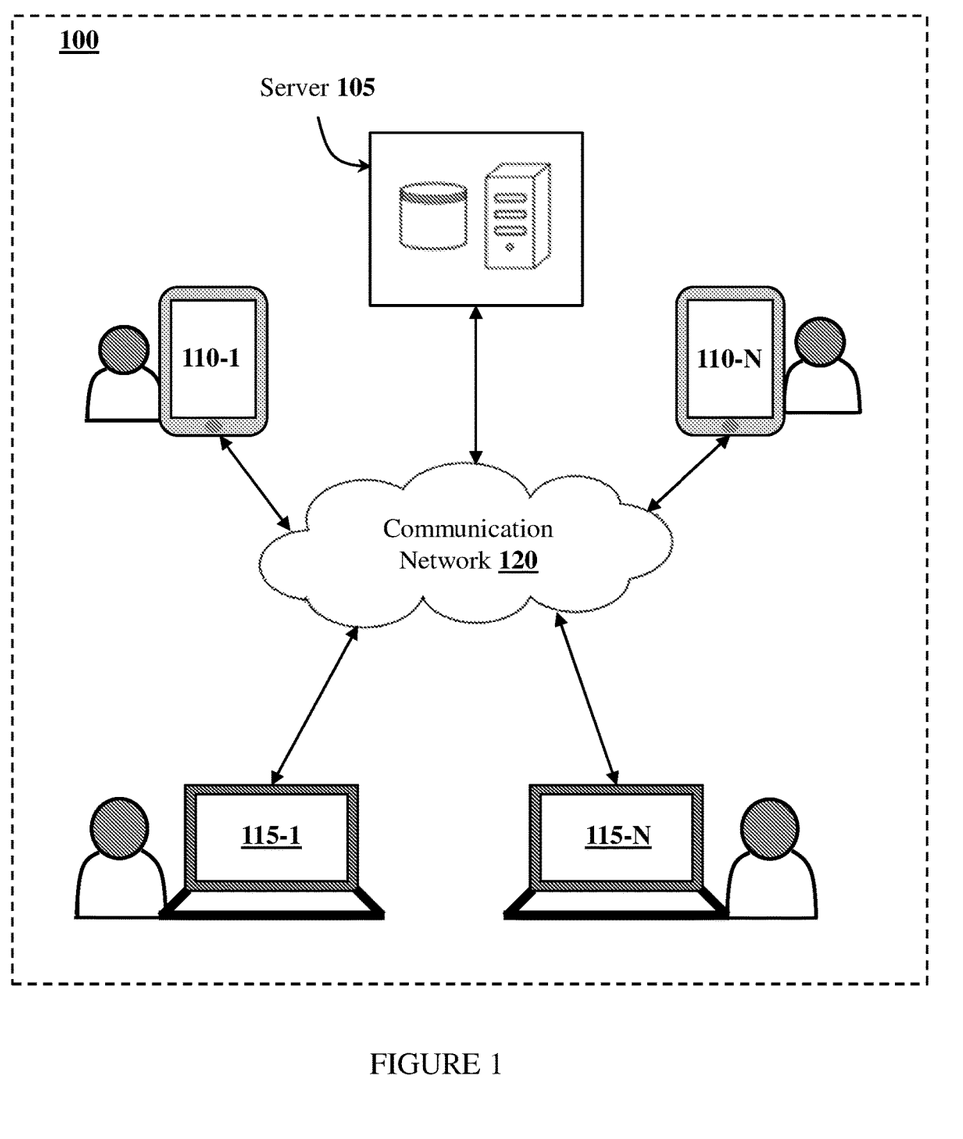
FIG. 1 illustrates a schematic representation of a contact center of an enterprise.

FIG. 1 illustrates a schematic representation of a contact center of an enterprise in which the system and the method disclosed in the present disclosure may be implemented. The contact center 100 comprises a server 105, a plurality of user devices 110-1 to 110-N, and a plurality of agent devices 115-1 to 115-N, wherein the server 105, the plurality of user devices 110-1 to 110-N, and the plurality of agent devices 115-1 to 115-N are communicatively connected through a communication network 120.

The user device 110 may be any computing device that often accompanies their users to perform various activities. By way of example, the user device 110 may include, but not limited to, a computer, a laptop, a notebook computer, a tablet, and a smartphone, having communication capabilities. Similarly, the agent device 115 may be computer, a laptop, a notebook computer, a tablet, and a smartphone, having communication capabilities. The user may contact the contact center of the enterprise through telephone calls, messages, using dedicated applications, etc., using the internet or the cellular network.

The communication network 120 may be a wireless network or a wired network or a combination thereof. Wireless network may include long range wireless radio, wireless personal area network (WPAN), wireless local area network (WLAN), mobile data communications such as 3G, 4G or any other similar technologies. The communication network 120 may be implemented as one of the different types of networks, such as intranet, local area network (LAN), wide area network (WAN), the internet, and the like. The communication network 120 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Further the communication network 120 may include a variety of network devices, including routers, bridges, servers, modems, computing devices, storage devices, and the like. In one implementation, the communication network 120 is internet which enables communication between the server 105, the user device 110, and the agent device 115.

The server 105 may include, for example, a mainframe computer, a computer server or a network of computers or a virtual server which provides functionalities or services for other programs or devices such as for the user device 115 and the agent device 115. In one implementation, the server 105 is a cloud server comprising one or more processors, associated processing modules, interfaces and storage devices communicatively interconnected to one another through one or more communication means for communicating information. The storage associated with the server 105 may include volatile and non-volatile memory devices for storing information and instructions to be executed by the one or more processors and for storing temporary variables or other intermediate information during processing.

It is to be noted that the server 105 may be configured to maintain one or more user accounts in a user database (not shown), each of which may include, but not limited to, username, password, address, payment details, transaction history, etc. For example, an insurance company may maintain the policy holder's name, address, nominee details, policy details, etc. Such information can be made available to the user upon authenticating the user. Further, it is to be noted that the server 105 may be implemented with chat system for facilitating and managing online chat sessions between user device 110 and the agent device 115. In addition, the server 105 may be implemented as an interactive voice response (IVR) system for facilitating and managing calls between the user device 110 and the agent device 115.

Figure 2:
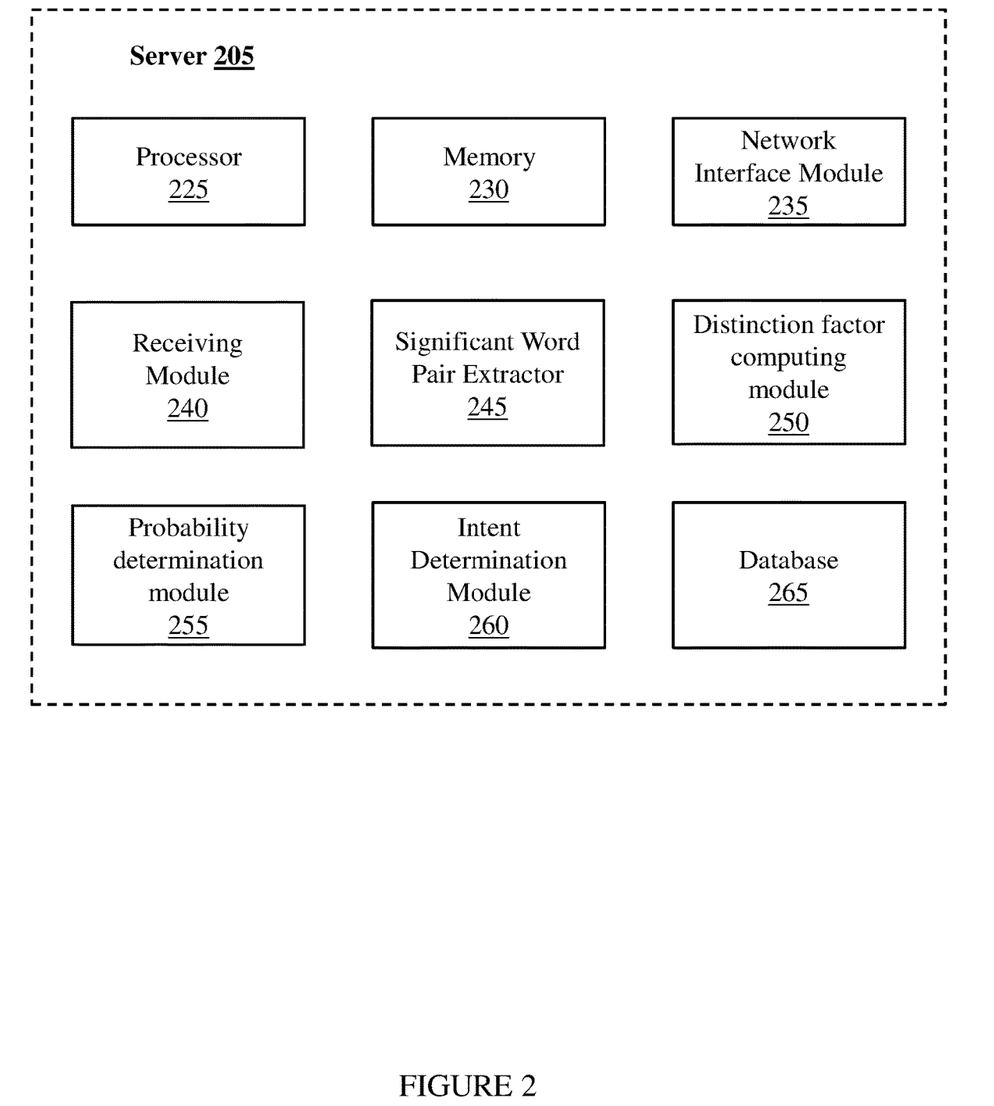
FIG. 2 is a block diagram of an exemplary server in accordance with an embodiment of the present disclosure.

FIG. 2 is a block diagram of an exemplary server in accordance with an embodiment of the present disclosure. The server 205 comprises a processor 225 for processing data, a memory 230 for storing instructions to be executed by the processor 225 and for storing temporary data, a network interface module 235 for enabling communication between the server 205 and other devices of contact center 100 of FIG. 1, a receiving module 240, a significant word pair extractor 245, a distinction factor computing module 250, a probability determination module 255, an intent determination module 260 and a database 265.

In one embodiment of the present disclosure, the server 205 is configured for determining an intent of the user by analyzing one or more utterances of the user. An utterance may be short speech which may include an enquiry, a statement, an expression, a question, etc. Further, the utterance may have words from more than one language. In one embodiment of the present disclosure, the server 205 creates an intent determination model which will be used for determining an intent of the user from the utterances of the user during a conversation.

To generate the intent determination model, the server 205 is fed with a plurality of sample utterances with each utterance having an intent class assigned. In an embodiment of the present disclosure, the intent class to an utterance is assigned by a human agent. For example, an utterance may be "I want to know my maturity value" and the intent class assigned may be "maturity value". Another exemplary utterance may be "I want to know my maturity date" or "mera policy ka/ki maturity date kya hai" (an utterance having two languages) and the intent class assigned may be "maturity date". Yet another utterance may be "My policy maturity value is wrong, need to talk to your manager" and the intent class is "escalation to manager". Similarly, a plurality of sample utterances and their intent classes are used to create and train the intent determination model. It is to be noted that an utterance may belong to multiple intent classes. For example, "My policy maturity value is wrong, need to talk to your manager" may be associated with an intent class "escalation to manager" and "policy details" and "maturity value".

As described, the utterance and associated intent class are stored in the memory 230 and these can be thought of as groups of utterances based on the intent class of each utterance in the sample set of utterances. That is, on receiving the sample set of utterances and their intent classes, the server 205 creates one or more groups of utterances based on the intent class of each of the utterances. For example, a group belonging to an intent class "maturity value" may have a plurality of sample utterances of a plurality of users.

Further, the significant word pair extractor 245 extracts one or more significant word pairs from each utterance in each group of the one or more groups of utterances. In one embodiment, the significant word pairs are extracted based on the intent class. For example, in the sample utterance "My policy maturity value is wrong, need to talk to your manager" and the intent class is "escalation to manager", the significant word pairs extracted may be "policy and value", "maturity and value" and "talk and manager". Similarly, the significant word pair extractor 245 extracts the one or more significant word pairs from each of the utterances and stores in the database 265. In a preferred embodiment of the present disclosure, the significant word pair extractor 245 initially identifies and deletes the non-distinct words from each of the plurality of sample utterances and generates the word pairs using the remaining distinct words. The non-distinct words as described herein include but not limited to pronouns, definite and indefinite articles, prepositions, conjunctions, and any other predefined stop words and are deleted from the utterances before significant word pairs are identified. For example, in the sample utterance "My policy maturity value is wrong, need to talk to your manager", the non-distinct words such as my, wrong, need to, and your, are removed and the significant word pairs are generated for the utterance.

Then the distinction factor computing module 250 computes a distinction factor of each significant word pair, and the probability determination module 255 determines a probability of predicting the intent class to which a significant word pair actually belongs, and computes a probability of predicting an intent class, to which the significant word pair does not belong.

The WDF of a significant word pair is measure that attempts to encapsulate a significant word pair's ability in differentiating the intent classes. Considering, the utterances which are related to insurance claims, a common significant word pair such as "I" and "want" will be present in many intent classes (many utterances will start with "I want to know") and thus will not provide enough useful information. However, a significant word pair such as "maturity" and "value", and "talk" and "manager" will likely be present in a relatively lesser number of intent classes (those which talk about maturity value of a claim, for example). Thus, "maturity and value" and "talk and manager" are expected to have a higher WDF compared to "I and want". Hence, a value for the WDF of each significant word pair is computed, linked with the word pair, and stored in the database 265.

Computation of the WDF of a significant word pair P is as follows. Considering that the significant word pair P is present in a total of N number of utterances, and there are K distinct intent classes in which W appears. Then WDF (P)=1−(K/N).

Thus, if P appears in just one intent class, WDF (P)=1−1/N, which is close to 1 as N goes large, while if W appears in many intent classes, WDF (P) starts falling approaching zero if K approaches N.

Further, for each significant word pair, the probability determination module 255 computes the probability of correctly predicting an intent class and the probability of incorrectly predicting an intent class. And links with value of the probabilities with the word pair and stores in the memory. A probability of correctly predicting an intent class by a significant word pair P with respect to an intent class C and a probability of incorrectly predicting an intent class by a significant word pair P with respect to an intent class C model the significant word pair's likelihood of being associated with the intent class C, correctly or incorrectly. In one embodiment of the present disclosure, the Positive Probability of a significant word pair is inversely proportional to a total number of intent classes to which the significant word pair actually belongs. In another embodiment, the Negative Probability of a significant word pair is directly proportional to a number of times the word pair belongs to a particular intent class. Thus, if intent class X contains a higher number of word pair P compared to intent class Y, the probability that P accurately predicts X is higher compared to Y. If a word pair occurs in many intent classes, it is "diluted"— whereas if a word pair occurs in just a few intent classes, it is more "pointed".

As described, in the initial training samples (set of sample utterances), each utterance is associated with at least one intent class, and the associated intent class may be correct or incorrect. For example, "I want to know about my policy maturity value", may be classified "policy details" intent class, classification type as "correct". This means that the training data has been correctly labeled. Further, "My policy maturity value is wrong, need to talk to your manager", may be classified as intent class "policy details", "maturity value" and "escalation to manager". This should have been only classified as intent "escalation to manager", and hence training data has been incorrectly labeled.

It is therefore possible that a significant word pair occurs in many different utterances and hence intent classes, and within each intent class they may be correct or incorrect. There are three possibilities:

P is present in an utterance, and it is rightly classified as class C, suppose there are N such cases.

P is present and it is wrongly classified as class C, suppose there are M such cases.

P is present and it is not classified as class C (either right or wrong), suppose there are Q such cases.

Then,

P accurately predicts (A)=N/(N+M+Q) fraction of cases

P wrongly predicts (W)=M/(M+N+Q) fraction of cases

P is irrelevant as far as C is concerned (I)=Q/(M+N+Q) fraction of cases

Wherein, A—a probability of correctly predicting an intent class C of the significant word pair P, and W—a probability of incorrectly predicting an intent class C of the significant word pair P. As described, for each significant word pair, the computation module 245 computes the probability of correctly predicting an intent class and probability of incorrectly predicting an intent class, and the same is used for determining an intent class of an utterance of the user.

For example, if a significant word pair "maturity value" appears in a total of 20 utterances, 18 of which are labeled as "policy details", and 2 are labeled as "escalation to manager". Out of the 18 "policy details", 15 are correct, while 3 are wrong. The 2 labels "escalation to manager" are correct. Then, for the significant word pair "maturity value", we will have:

For the intent class "policy details", the probability of correct intent=15/18=5/6, and the probability of incorrect intent=3/18=1/6.

For the intent class "escalation to manager", the probability of correct intent=1.

From the above description, it is clear that with the available training data, if the data has labeled an utterance with the significant word pair "maturity value" as "talk to executive", then it is almost certain that it has done correctly, while if it has labeled it as "policy details" then there is a 16.6% chance of its being incorrect and needs further analysis by a human expert. The computed distinction factor of each significant word pair, and the probability of correctly predicting an intent class and the probability of incorrectly predicting an intent class are stored in the database 260. In other words, the server 105 builds the intent determination model, wherein the intent determination model comprises a plurality of sample utterances with intent class labeled (in other words, one or more groups of utterances and their intent class), the distinction factor for each significant word pair, the probability of correctly predicting an intent class for each of the significant word pair s, and the probability of incorrectly predicting an intent class for each of the significant word pairs.

In one embodiment of the present disclosure, the intent determination module 260 uses the intent determination model for determining an intent of the user from the utterances of the user. In one embodiment of the present disclosure, on receiving an utterance of a user, the significant word pair extractor 245 extracts one or more significant word pairs from the utterance of the user. To extract the significant word pair, as described, the significant word pair extractor 245 initially identifies and deletes the non-distinct words from the utterance and generates the word pairs using the remaining distinct words. The non-distinct words as described herein may include but not limited to pronouns, definite and indefinite articles, prepositions, conjunctions, and any other predefined stop words and are deleted from the utterances before significant word pairs are identified. For example, the significant word pair extractor 245 uses a list of stop-words (commonly occurring words) such as but not limited to he, she, it, we, is, are, the, etc., a list of synonyms, and a list of domain specific keywords, for example, with insurance policy related calls, domain specific words may contain insurance, policy, reimbursement, closure, maturity, etc., for identifying the one or more significant word pairs from the user utterance.

Initially, on receiving an utterance of a user, the significant word pair extractor 245 coverts the utterance into textual form and performs spell checking to correct the spelling errors if any, especially for domain specific keywords. Suppose the utterance is "I want to know about my polici details and also about my insurance maturity value". The wrong spelling, "polici" is corrected to "policy" and the corrected utterance will be "I want to know about my policy details and also about my insurance maturity value".

Further, the significant word pair extractor 245 removes all stop-words (non-distinct words) from the utterance. Thus, the exemplary spellchecked utterance "I want to know about my policy details and also about my insurance maturity value" will become "want know policy details insurance maturity value" assuming that the stop-words list contains I, to, about, my, and, also. Once the stop-words are removed, all synonyms are unified. Thus, if "insurance" is defined as a synonym of "policy", all occurrences of "insurance" will be replaced by "policy". Hence the exemplary utterance becomes "want know policy details policy maturity value". The reduced utterance is then scanned for domain specific words. Thus, the above example will return domain specific words like "policy" and "maturity". The significant word pair extractor 245 identifies each of such domain specific keywords to form the significant word pairs. In one embodiment, the significant word pair extractor 245 is configured for selecting other words occurring within a predetermined word gap, for example three words gap of such keywords to form the significant word pairs.

Considering the above example, replacing the synonyms, the utterance will be "want know policy details policy maturity value", and out of which "policy" and "maturity" are domain specific words. For "policy", the significant word pair extractor 245 selects other words within a word distance of three words and extracts the significant word pairs-(want policy), (know policy), (policy details), (policy maturity), (policy value), (maturity value), (details maturity). In case no domain specific keywords are found in a given utterance, the user is prompted to select some of the words as domain specific, which are then used for identifying the significant word pairs.

Then the intent determination module 260 identifies, in the intent determination model, one or more significant word pairs matching with each of the one or more significant word pairs extracted from the utterances of the user.

If at least one matching significant word pair is available, then the intent determination module 260 determines the intent class of the utterance based on the WDF, the probability of correctly predicting an intent class for each of the significant word pairs, and the probability of incorrectly predicting an intent class for each of the significant word pairs. Considering if ten matching significant word pairs are available in the intent determination model for a significant word pair extracted from the utterance of the user, then the intent determination module 260 selects the intent of the matching significant word pair which is having highest word destination factor, highest probability of correctly predicting an associated intent class, and lowest probability of incorrectly predicting as associated intent class.

Considering a significant word pair P (which is matching with a significant word pair extracted from the utterance of the user) belonging to an intent class X, the WDF (P)=1−(K/N) that is, (1−(number of distinct classes/total count)), which is stored in the intent determination model). As described, the WDF quantifies how distinct a significant word pair is for a particular class. If a significant word pair appears in many classes, its power of distinction is poor. For example, if a word pair appears in five classes (A, B, C, D, and E), then its distinction factor (distinctive power) is poor, as it may belong to any of the five classes. While if a word appears exclusively in one class A, then the word pair has a very high distinctive power. However, the system considers how many times a word pair occurred. If a word pair occurs only once in only one class, then it cannot be certain at all if it has any distinctive power. Therefore, a word pair's power of identifying a class increases if it appears many times and yet appears only in a minimum number of classes. Hence, the WDF (P) is computed as—WDF=1−(K/N) that is, (1−(number of distinct classes/total count)), where N is the number of times the word pair appeared, and K is the number of classes in which the word pair is appeared. For example, if the word pair appears in only one class, then K=1. As the number of occurrences increases, N increases and K/N reduces, making 1−K/N higher, tending to 1. If N=1, then there is no distinction and 1−K/N=0.

The intent determination module 260 uses the WDF to determine the intent class of the user utterance. For example, if WDF (P)<0.5, the intent determination module 260 rejects the pair P as weak. Otherwise, there are three possibilities as described.

P is present and it is rightly classified as class X, suppose there are N such cases P is present and it is wrongly classified as class X, suppose there are M such cases P is present and it is not classified as class X (either right or wrong), suppose there are Q such cases.

Then, as far as class X is concerned,

P accurately predicts (A)=N/(N+M+Q) fraction of cases

P wrongly predicts (W)=M/(M+N+Q) fraction of cases.

P is irrelevant as far as X is concerned is (I)=Q/(M+N+Q) fraction of cases.

Hence, the significant word pair P (which is matching with a significant word pair extracted from the utterance of the user, hence the user utterance) maps to a class X strongly if A is significantly higher compared to W and I, and among all such candidate classes A is maximum. (A>W and A>I).

The way in which the system determines an intent of user from the utterance of the user is described in detail further below.

Considering an example utterance "I want to know my policy maturity value details", the system identifies three words pairs (policy details), (maturity value), and (maturity know). Considering that the three word-pairs belongs to two intent classes and having WDFs (stored in the intent determination model)—

| Significant word pair s | WDF | Intent Class |
|---|---|---|
| (policy details) | 0.60 | Policy_Information Close_Policy |
| (maturity value) | 0.65 | Policy_Information Close_Policy |
| (maturity know) | 0.45 | Policy_Information |

Since the significant word pair (maturity know) has WDF of 0.45, which is less than 0.5, the intent determination module 260 discards the significant word pair. The probabilities calculated for the remaining two word-pairs with respect to the two intent classes are as in the following table.

| Significant word pairs (P) | Intent Class (X) | A (probability that P accurately predicts class X) | W (probability that P wrongly predicts class X) | I (probability that P is irrelevant for class X) | Observation | Inference |
|---|---|---|---|---|---|---|
| (policy details) | Policy_information | 0.7 | 0.2 | 0.1 | A > W and A > I. Possibly predicting accurately | Candidate class |
| (Policy details) | Close_policy | 0.3 | 0.4 | 0.3 | A < W. Not reliable. | Ignore this class |
| (maturity value) | Policy_information | 0.6 | 0.3 | 0.1 | A > W, A > I. Reliable. | Candidate class |
| (maturity value) | Close_policy | 0.6 | 0.2 | 0.2 | A > W, A > I. Reliable. | Candidate class |

The probabilities associated with significant word pair (policy details) and the intent class "policy_information" are A=0.7, W=0.2, and I=0.1, and with the intent class "close_policy" are A=0.3, W=0.4, I=0.3. Hence for significant word pair (policy details) and intent class "policy_information", A>W and A>I, so the most likely class is "policy_information". Intent class "Close_policy" is not a candidate as far as this significant word pair is concerned.

Further, the probabilities associated with the significant word pair (maturity value) and the intent class "policy_information" are A=0.6, W=0.3, and I=0.1, and with the intent class "close_policy" are A=0.6, W=0.2, I=0.2. In both cases, A>W and A>I, and A is same in both cases, so both are likely with equal probability as far as the significant word pair is concerned.

Thus, there are two candidates, policy_information with probability A=0.7 and 0.6, and close_policy with probability A=0.6. However, A (probability that a significant word pair accurately predicts an intent class) computed for significant word pair (policy details) is 0.7, which is higher. Hence the intent determination module 260 selects the significant word pair (policy details) and return the final sorted intent class list from highest possibility to lowest, and in this example the significant word pairs are (policy_information) and (close_policy). In a preferred embodiment of the present disclosure, the intent determination module 260 selects the intent class (policy_information) as the intent of user. In this example, three words pairs are identified in the user utterance and exactly matching significant word pairs are identified in the intent determination model. However, a single significant word pair identified in the user utterance may match one or more word-pairs stored in the intent determination model and in such a scenario, the intent determination module 260 performs the same process for determining the intent of the user.

Further, if more than one different intent classes are found with the same probability, the tie is broken arbitrarily, or both of them are provided to a human expert for marking the decision.

Furthermore, it is possible that once the stop-words are removed and the synonyms are replaced, the utterance may be reduced to just one domain specific keyword, for example D. For example, an utterance "What is the maturity?" "What", "is" and "the" are stop-words, so the system identifies a single word "maturity", and no significant word pair can be formed. In such a case, the system identifies all significant word pairs in the model containing the word D and picks the intent class which occurs the maximum number of times. In the example, there is only one word "maturity". The system looks at all stored model significant word pairs which have "maturity" in them. For example, if there are (maturity value), (maturity details) and (close maturity), and the significant word pair (maturity value) has highest probability A with intent class policy_information, and the significant word pair (maturity details) also has the same probability A with intent class policy_information, and the significant word pair (date maturity) has the same probability A with intent class close_policy. The system selects the intent class policy_information because the intent class policy_information occurs two times, while the intent class close_policy occurs one time. If there are equal numbers for more than one class, the tie is broken arbitrarily.

Furthermore, if there is an utterance with no domain specific word (after spelling check and stop-word removal), the system forms all significant word pair s with the words available, and then compute the WDF and probabilities from the historical data, and then predicts an intent class. For example, if the utterance is "This is my updated contact address, phone, email". After stop-word removal, we the words include "updated contact address, phone, email". Since none of these words are domain specific, so no model significant word pair can be found. In this case, all possible significant word pairs are formed. For example, the system generates the below significant word pairs,

| | | |
|---|---|---|
| (updated contact) | (updated address) | (updated phone) |
| (updated email) | (contact address) | (contact phone) |
| (contact email) | (address phone) | (address email) |
| (phone email) | | |

Then the system uses the historical to search for these significant word pair s, their WDF and calculates the probabilities and determines the intent class of the utterance. If no class label is found, the system prompts the user to assign an intent class, which will be stored for future reference.

If a matching significant word pair is unavailable in the intent determination model, then the intent determination module 260 submits the utterance for human feedback, receives an intent class for the utterance which may be an existing intent class or a completely new intent class, and updates the intent identification model with the received intent class identified by the human user, corresponding to the extracted significant word pairs.

Figure 3:
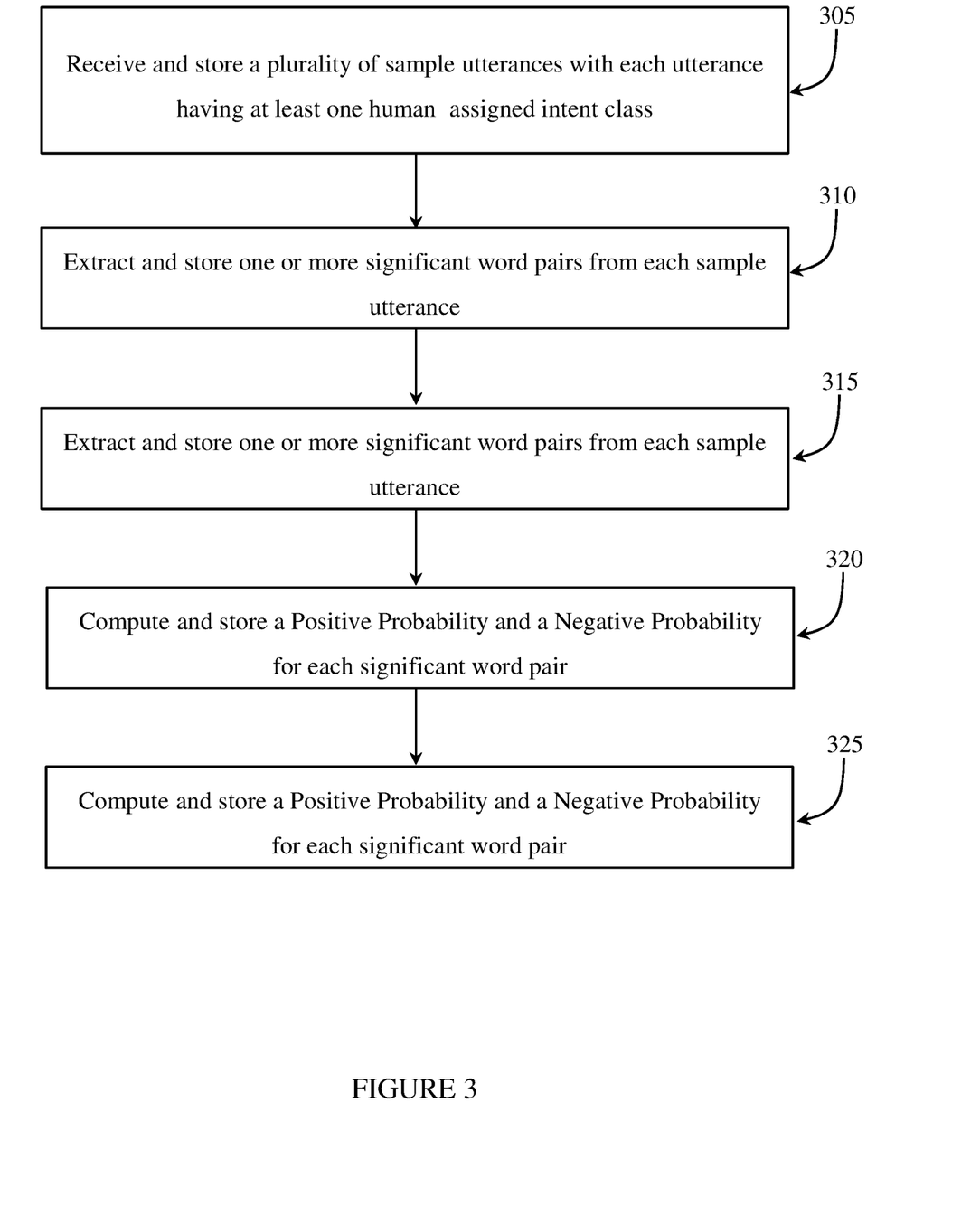
FIG. 3 is flowchart illustrating a method of building an intent determination model for determining an intent of a user utterance in accordance with an embodiment of the present disclosure.

FIG. 3 is flowchart illustrating a method of building an intent determination model for determining an intent of a user utterance in accordance with an embodiment of the present disclosure. As shown, at step 305 the receiving module 240 receives a plurality of sample utterances with each utterance having at least one human assigned intent class from a user and stores in the memory 230.

At step 310, the significant word pair extractor 245 extracts one or more significant word pairs from each sample utterance and stores the same in the memory 230. As described, in a preferred embodiment of the present disclosure, the significant word pair extractor 245 initially identifies and deletes the non-distinct words from each of the plurality of sample utterances and generates the word pairs using the remaining distinct words. The non-distinct words as described herein include but not limited to pronouns, definite and indefinite articles, prepositions, conjunctions, and any other predefined stop words and are deleted from the utterances before significant word pairs are identified. For example, in the sample utterance "My policy maturity value is wrong, need to talk to your manager", the non-distinct words such as my, wrong, need to, and your, are removed and the significant word pairs are generated for the utterance.

At step 315, the distinction factor computing module 250 computes a distinction factor of each significant word pairs and stores each significant word pair and its computed distinction factors as a pair in the database 265. The WDF of a significant word pair is measure that attempts to encapsulate a significant word pair's ability in differentiating the intent classes. In one embodiment, the WDF (P) is computed as—WDF=1−(K/N) that is, (1−(number of distinct classes/total count)), where N is the number of times the word pair appeared, and K is the number of classes in which the word pair is appeared.

At step 320, the probability determination module 255 computes a Positive Probability and a Negative Probability for each significant word pair and stores each significant word pair and its Positive Probability and Negative probability in the database 265. As described, the Positive Probability represents the probability of predicting the intent class to which a significant word pair actually belongs and the Negative Probability represents a probability of predicting an intent class, to which the significant word pair does not belong.

Hence, the intent determination model comprises the plurality of utterances and their human assigned intent classes, extracted significant word pairs and the distinction factors of each of the significant word pairs, the probability of predicting the intent class to which a significant word pair actually belongs (Positive Probability), and a probability of predicting an intent class, to which the significant word pair does not belong (Negative Probability). This is used for determining an intent of a user. That is, when the system receives a new utterance from the user, the system uses the intent determination model for determining the intent of the user.

Figure 4:
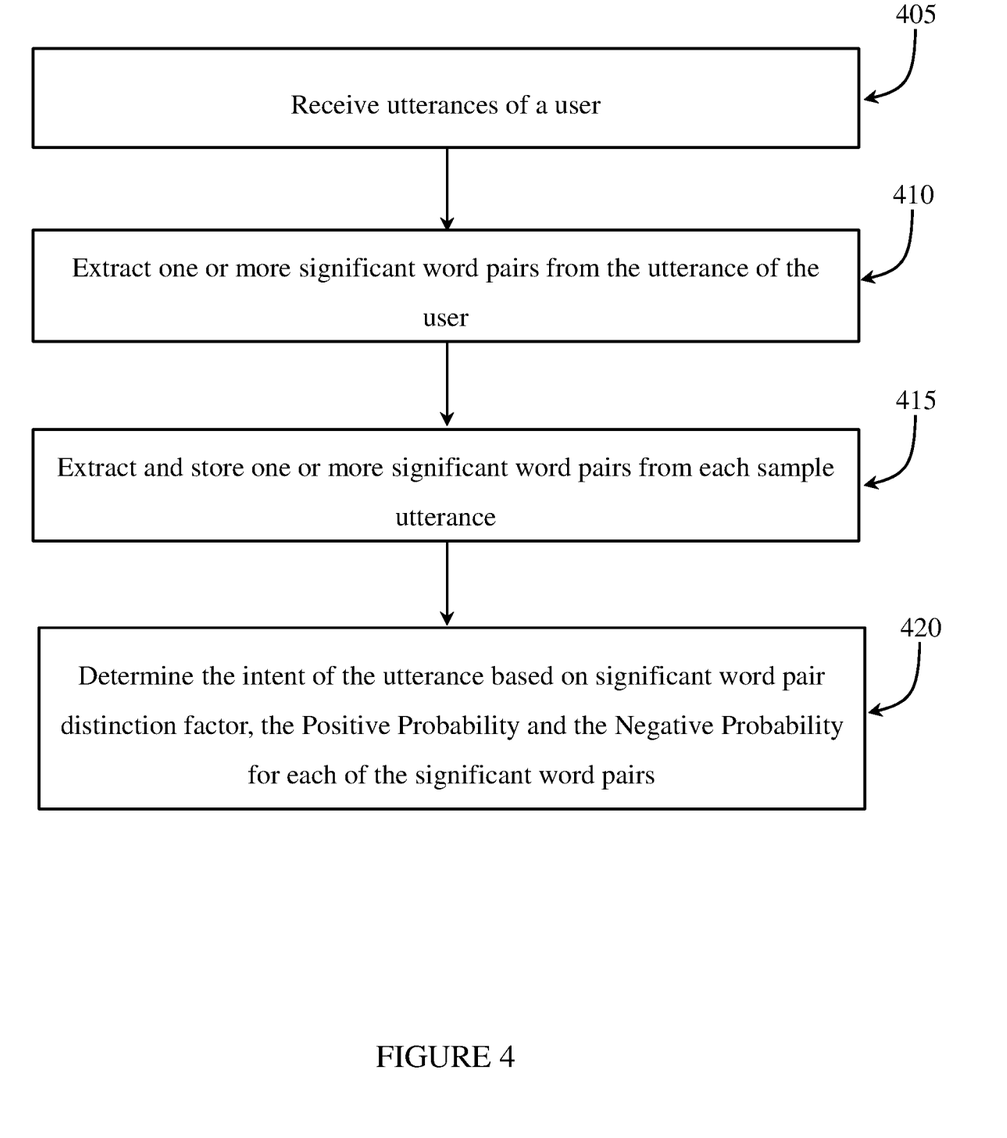
FIG. 4 is a flowchart illustrating a method of determining an intent of a user using the intent determination model in accordance with an embodiment of the present disclosure.

FIG. 4 is a flowchart illustrating a method of determining an intent of a user using the intent determination model in accordance with an embodiment of the present disclosure. As shows, at step 405, the receiving module 235, an utterance of the user. Considering an interactive voice response system in which the system disclosed in the present disclosure is implemented, the server receives the utterances of a customer for determining the intent of the customer.

At step 410, the significant word pair extractor 240 extracts one or more significant word pairs from the utterance of the user. It is to be noted that the one or more significant word pairs are extracted using the same method as described in the present disclosure.

At step 415, the intent determination module 255 identifies one or more significant word pairs stored in the intent determination model, the one or more significant word pairs matching each of the one or more significant word pairs extracted from the utterance of the user.

At step 420, the intent determination module 255 determines the intent of the utterance based on significant word pair distinction factor, the Positive Probability and the Negative Probability for each of the significant word pairs, for determining the intent of the user utterances.

As described, the system initially builds an initial model for intent determination model for determining an intent of a user utterance and uses the model for determining an intent of the user from the one or more utterances of the user during a conversation.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A method for building an intent determination model for determining an intent of a user utterance and providing information related to the determined intent to a user in real-time or near real-time, the method comprising:

a step of receiving by a receiving module and storing in a memory, a plurality of sample utterances with each sample utterance having at least one human assigned intent class;

a step of extracting one or more significant word pairs, by a significant word pair extraction module, from each sample utterance of the plurality of sample utterances and storing the one or more significant word pairs in the memory, wherein the step of extracting the one or more significant word pairs comprises: a step of identifying and deleting non-distinct words from each sample utterance of the plurality of sample utterances, wherein the non-distinct words include one or more of pronouns, definite and indefinite articles, prepositions, conjunctions, and predefined stop words; and a step of generating the one or more significant word pairs using distinct words from the plurality of sample utterances;

a step of computing a distinction factor of each significant word pair, by a distinction factor computing module, and storing each significant word pair and its computed distinction factor as a pair in the memory, wherein computing the distinction factor comprises determining a ratio of a number of intent classes to which a significant word pair actually belongs and a total number of intent classes, wherein the distinction factor of the significant word pair is a measure that attempts to encapsulate the significant word pair's ability in differentiating the intent classes;

a step of computing, for each significant word pair, a Positive Probability, by a probability determination module, and storing each significant word pair and its Positive Probability in the memory, wherein the Positive Probability is a probability of calculating an intent class to which a significant word pair belongs;

a step of computing, for each significant word pair, a Negative Probability, by the probability determination module, and storing each significant word pair and its Negative Probability in a database, wherein the Negative Probability is a probability of predicting an intent class to which a significant word pair does not belong;

a step of building the intent determination model, wherein the intent determination model comprises the plurality of sample utterances with the intent class labelled, the distinction factor for each significant word pair, the Positive Probability, and the Negative Probability, wherein the intent determination model is built to determine the intent of the user utterance and provide the information related to the determined intent to the user in real-time or near real-time;

a step of receiving, by the receiving module, an utterance of the user;

a step of extracting, by the significant word pair extraction module, one or more significant word pairs from the utterance of the user;

a step of identifying, by an intent determination module, one or more significant word pairs stored in the intent determination model matching each of the one or more significant word pairs extracted from the utterance of the user; and a step of determining, by the intent determination module, the intent of the utterance based on the distinction factor, the Positive Probability, and the Negative Probability for each of the significant word pair, comprised in the intent determination model.

2. The method of claim 1, wherein the plurality of sample utterances and their intent classes are updated, in the intent determination model, with one or more of a new utterance and a new intent class by receiving human feedback.

3. The method of claim 1, wherein the plurality of sample utterances comprises words of one or more languages.

4. The method of claim 1, wherein the distinction factor is inversely proportional to the ratio of the number of intent classes to which the significant word pair actually belongs and the total number of intent classes.

5. The method of claim 1, wherein the Positive Probability of the significant word pair is inversely proportional to the number of intent classes to which the significant word pair actually belongs.

6. The method of claim 1, wherein the Negative Probability of the significant word pair is directly proportional to number of times the significant word pair belongs to a particular intent class.

7. The method of claim 6, further comprising a step of, terminating the process of determining the intent of the utterance when a matching pair is not found in the intent determination model for the one or more significant word pairs detected from the user utterance and storing the user utterance for assigning one or more intent classes by a human agent to the user utterance.

8. The method of claim 1, wherein the step of determining the intent of the utterance comprises a step of determining an intent of the user during an online interaction or conversation an interactive voice response (IVR) system.

* * * * *